United States Patent

Weisend, Jr. et al.

[11] Patent Number: 5,398,890
[45] Date of Patent: Mar. 21, 1995

[54] PNEUMATIC DEICER ASSEMBLY HAVING A SELF CONNECTING SHELL

[75] Inventors: Norbert A. Weisend, Jr., Cuyahoga Falls; Alan J. Fahrner, Canton, both of Ohio

[73] Assignee: The B. F. Goodrich Company, Akron, Ohio

[21] Appl. No.: 981,672

[22] Filed: Nov. 25, 1992

[51] Int. Cl.6 .................. B64D 15/16; B64D 15/18
[52] U.S. Cl. ................... 244/134 A; 244/134 R
[58] Field of Search ........... 244/134 R, 134 A, 134 E; 403/375, 380, 381

[56] References Cited

U.S. PATENT DOCUMENTS

| | | | |
|---|---|---|---|
| 2,539,576 | 1/1951 | Gregg | 244/134 A |
| 4,504,168 | 3/1985 | Miller | 403/381 |
| 4,561,613 | 5/1983 | Weisend, Jr. | 244/134 A |
| 4,687,159 | 2/1985 | Kageorge | 244/134 A |
| 4,779,823 | 11/1986 | Ely et al. | 244/134 A |
| 4,836,474 | 6/1989 | Briscoe et al. | 244/134 A |
| 4,916,781 | 4/1990 | Ball | 403/381 |
| 5,014,934 | 5/1991 | McClaflin | 244/132 |
| 5,098,037 | 3/1992 | Leffel et al. | 244/134 A |
| 5,112,011 | 5/1992 | Weisend, Jr. et al. | 244/134 A |
| 5,164,242 | 11/1992 | Webster et al. | 156/60 |

Primary Examiner—Michael S. Huppert
Assistant Examiner—Virna Lissi Ansley
Attorney, Agent, or Firm—Richard A. Romanchik

[57] ABSTRACT

A pneumatic deicing system for deicing an airfoil includes a flexible deicing member having inflatable tube-like passages provided therein for being inflated with a pressurized fluid, wherein the deicing member is bonded to a shell having a snap type connector for mating with another connector either on the airfoil or integrated into another part of the shell. An air connector extends through the shell and is utilized for putting the deicing member in fluid connection with the fluid source. Radar absorptive material may be disposed between the shell and the deicing member for reducing the radar cross section of the airfoil.

27 Claims, 5 Drawing Sheets

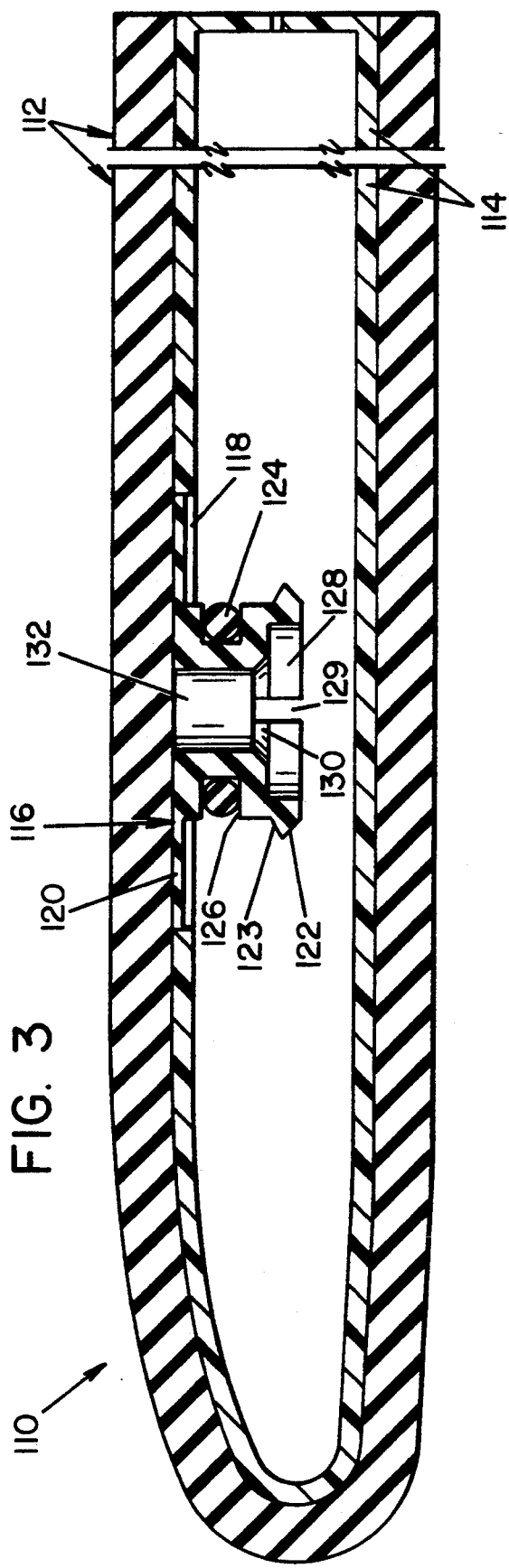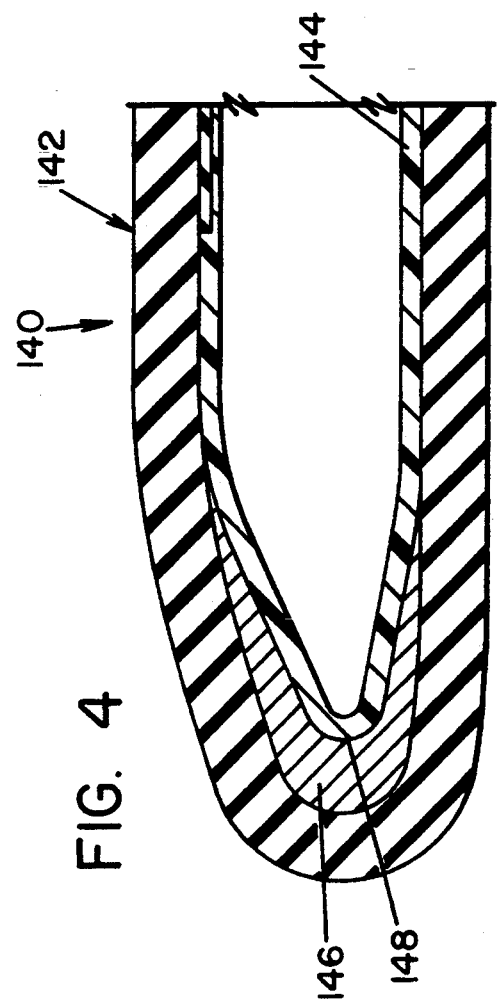

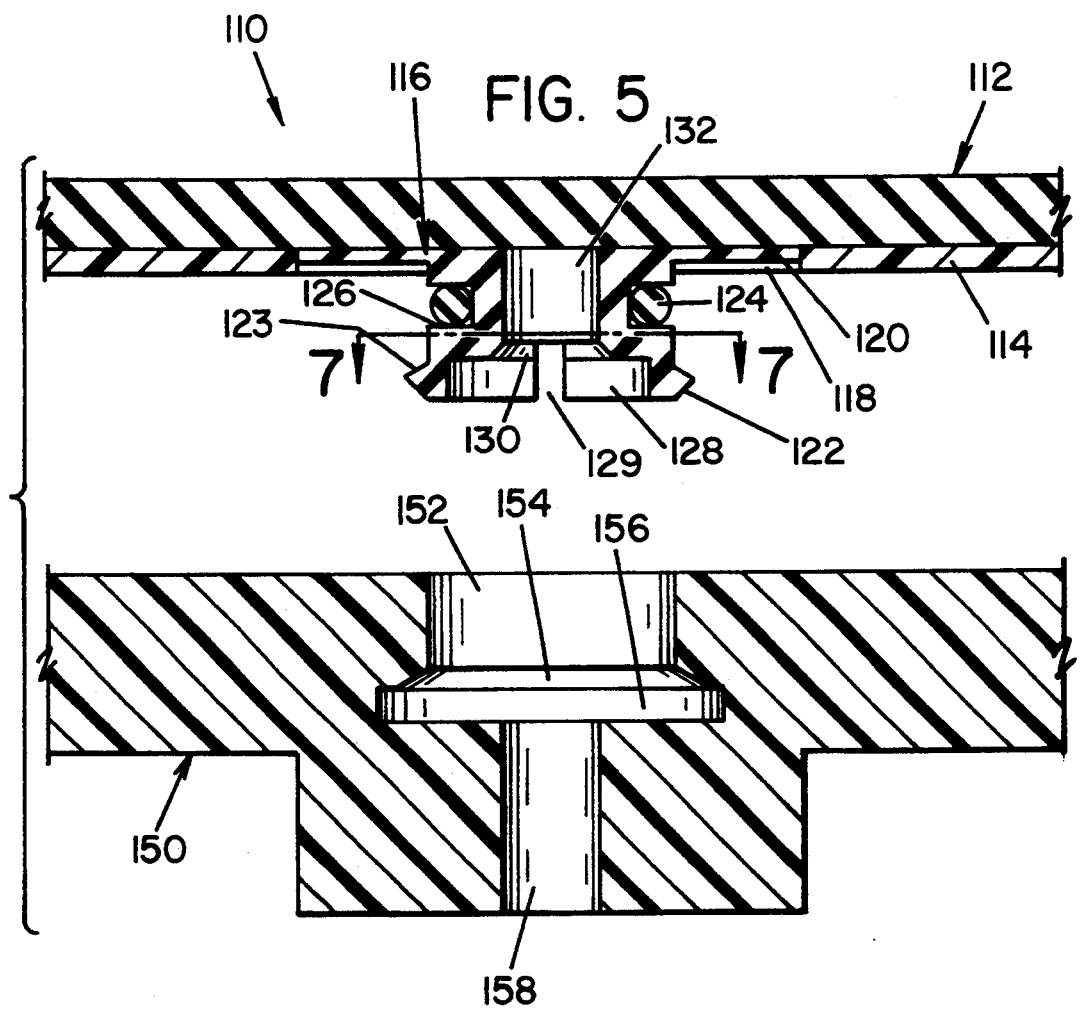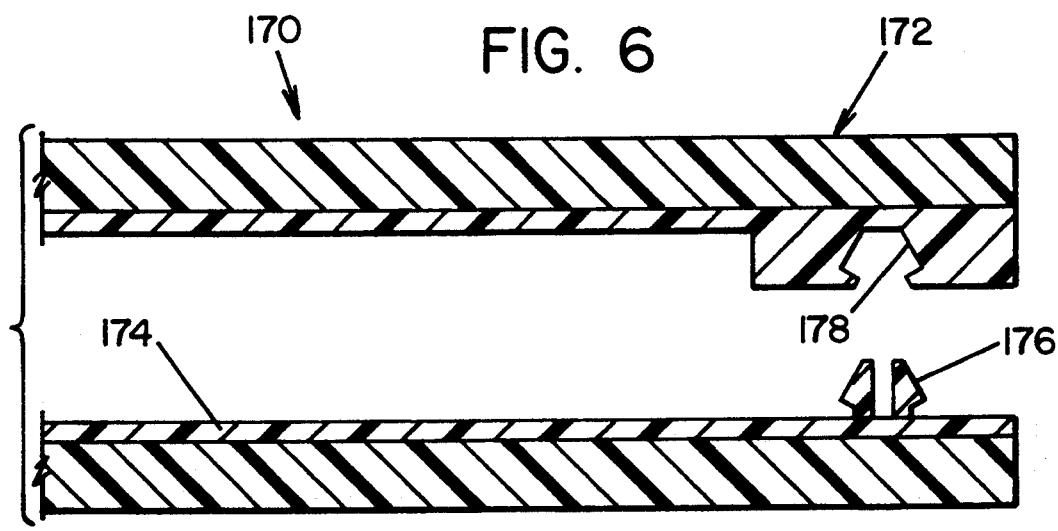

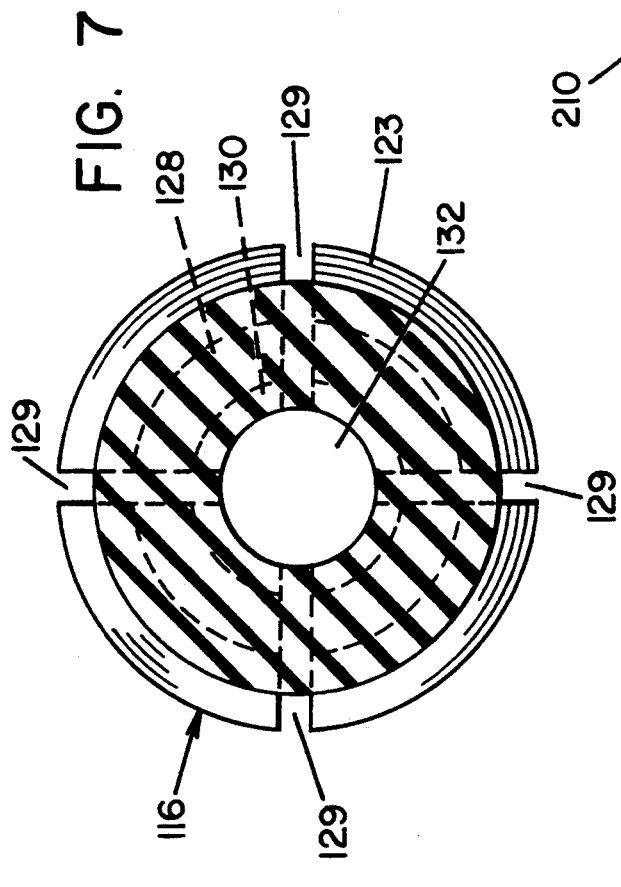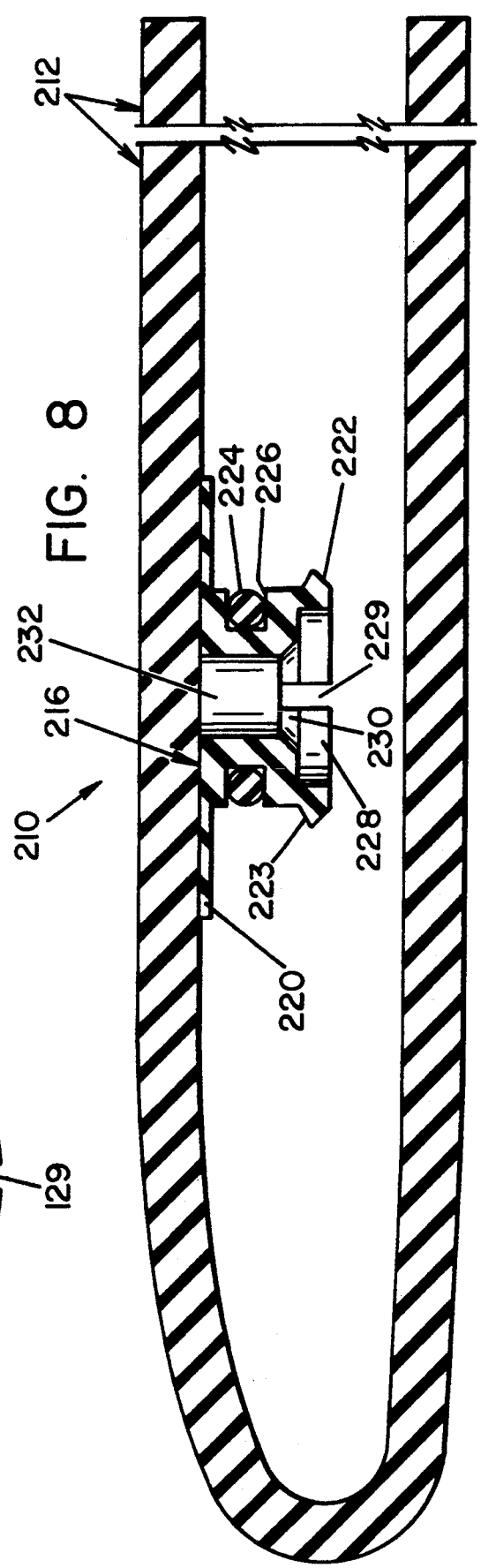

PNEUMATIC DEICER ASSEMBLY HAVING A SELF CONNECTING SHELL

FIELD OF THE INVENTION

The present invention relates to deicing systems and more particularly, a pneumatic deicing system adaptable to small cross-section airfoils.

BACKGROUND OF THE INVENTION

Under certain operating conditions aircraft are vulnerable to accumulation of ice on component surfaces. It is well known that such accumulation of ice can lead to disastrous results. A wide variety of systems have been developed for removing ice from aircraft during flight and can be placed into three general categories: thermal, chemical, and mechanical.

The mechanical category of deicing systems operate by distorting the airfoil surface of the aircraft to be deiced. Distortion of the airfoil surface causes cracking in the ice accumulated thereon, and subsequent dispersal of that ice into the air stream passing over the aircraft component.

The principal commercial mechanical deicing means is commonly referred to as pneumatic deicing wherein a component (e.g. the leading edge of a wing) of an aircraft is covered with a plurality of expandable, generally tube-like structures inflatable by employing a pressurized fluid, typically air. Upon inflation, the tubular structures tend to expand substantially the leading edge profile of the wing or strut and crack ice accumulating thereon for dispersal into the air stream passing over the aircraft component. Typically, such tube-like structures have been configured to extend substantially parallel to the leading edge of the aircraft component.

FIG. 1 illustrates a prior pneumatic deicer 12 formed from an elastomeric composite having rubbery or substantially elastic properties. The deicer 12 is disposed on an airfoil 14. A plurality of tubes 16 are formed in the composite and are provided pressurized fluid, such as air, from a manifold 18. The manifold 18 is supplied fluid via a connector, 20, which transfers fluid from a pressurized source (not shown). Connector 20 is integrated into the deicer 12 during manufacturing. Tubes 16 expand or stretch under pressure by 40% or more during inflation cycles, thereby causing a substantial change in the profile of the deicer (as well as the leading edge) to cause cracking of ice accumulating thereon.

Referring now to FIG. 2, a prior pneumatic deicing system 10 is comprised of a deicer 12 having a plurality of tubes 16 and a manifold 18 provided therein. The deicer 12 is bonded or attached to an airfoil 14. Pressurized fluid is provided to manifold 18 via a connector 20, which is integrated into deicer 12. A large hole 22 must be provided in airfoil 14 in order to accommodate connector 20. One drawback to the system illustrated in FIGS. 1 and 2 is that hole 22 provides a significant source of radar reflection when so exposed. Another drawback to this deicing system is that connector 20 represents a size limitation in that the thickness of the airfoil 14 cannot be smaller than the smallest manufacturable height of connector 20. In other words, connector 20 imposes a size restriction on the airfoil because the connector can be reduced in size only so much. The deicer system cannot be utilized therefore, for very thin airfoils, such as propellers of an airplane or the rotor of a helicopter. Efforts to improve such pneumatic deicing systems have led to continuing developments to improve their versatility, practicality and efficiency.

DISCLOSURE OF THE INVENTION

An object of the present invention is to provide a pneumatic deicer assembly which is formed and bonded to a shell that fits over and is secured mechanically to the airfoil surface to be deiced.

Another object of the present invention is to provide a pneumatic deicer which is formed or bonded to a shell that fits over and is secured mechanically to the airfoil surface to be protected, which includes a fluid connective fitting protruding from the pneumatic deicer assembly area.

According to the present invention a deicing system is comprised substantially of a flexible material or composite, which includes a plurality of tube-like members formed therein and arranged substantially parallel to one another, which expand or inflate when provided a pressurized fluid. The flexible material is formed or bonded to a hardened shell that fits over and is secured mechanically to the airfoil surface to be protected.

In accordance with a second embodiment of the second invention, a pneumatic deicing system is comprised substantially of a flexible material composite, which includes a plurality of tube-like members formed therein and arranged substantially parallel to one another, which expand or inflate when provided a pressurized fluid. The flexible material is formed or bonded to a shell that fits over and is secured mechanically to the airfoil surface to be protected. A fluid connective fitting is provided in the shell to be mated with a connector in the airfoil in order to provide fluid communication between a fluid source and the inflatable tube-like members.

The present invention allows for installation of pneumatic deicers where limited physical access prevents or limits use of prior pneumatic deicing systems. The present invention is easy to manufacture and is also easy to replace during regular maintenance overhauls.

These and other objects, features, and advantages of the present invention will become more apparent in light of the detailed description of exemplary embodiments thereof, as illustrated by the drawings.

BRIEF DESCRIPTION OF THE DRAWINGS

FIG. 3 is a cross-sectional view of a pneumatic deicing system in accordance with a first embodiment of the present invention.

FIG. 4 is a fragmentary cross-sectional view of a deicing system in accordance with a second embodiment of the present invention.

FIG. 5 is an exploded cross-sectional view of a connection means for a deicing system in accordance with the present invention of the first embodiment.

FIG. 6 is an exploded fragmentary cross-sectional view of a pneumatic deicing assembly in accordance with a third embodiment of the present invention.

FIG. 7 is a further enlarged cross-sectional view of a connector for a pneumatic deicing assembly in accordance with the present invention taken along line 7—7 of FIG. 5.

FIG. 8 is a cross-sectional view of a pneumatic deicing system in accordance with a fourth embodiment of the present invention.

BEST MODE FOR CARRYING OUT THE INVENTION

Figure 1:
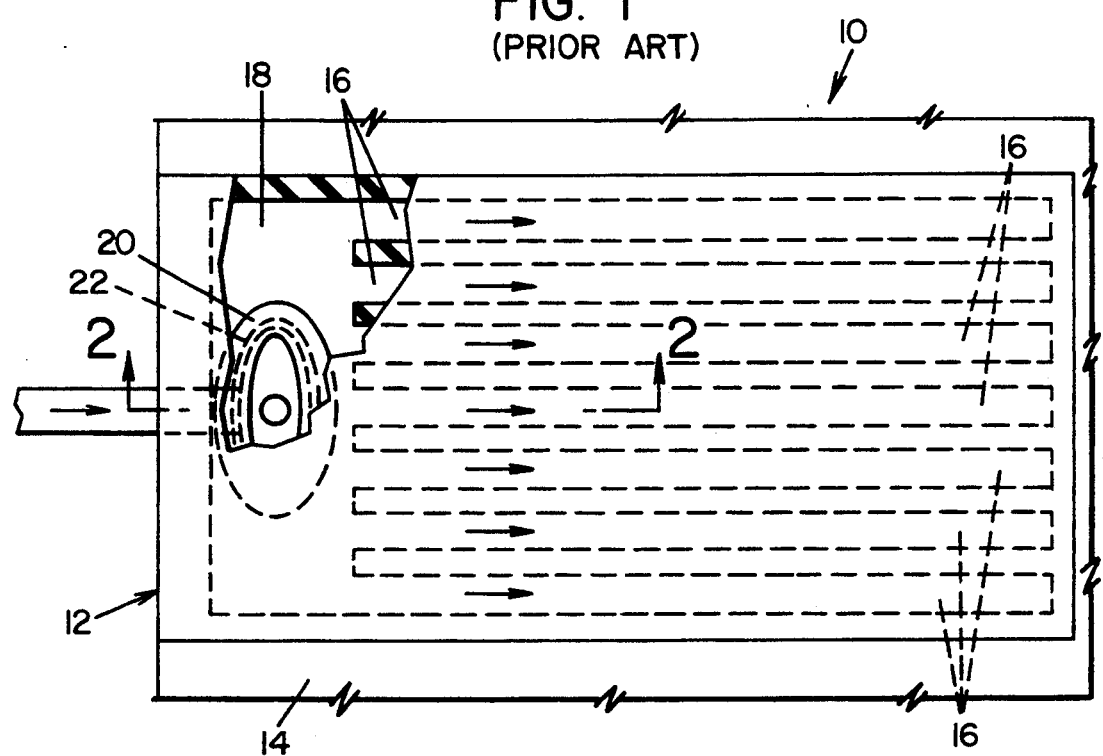
FIG. 1 is a top view of a prior art deicing system.
Figure 2:
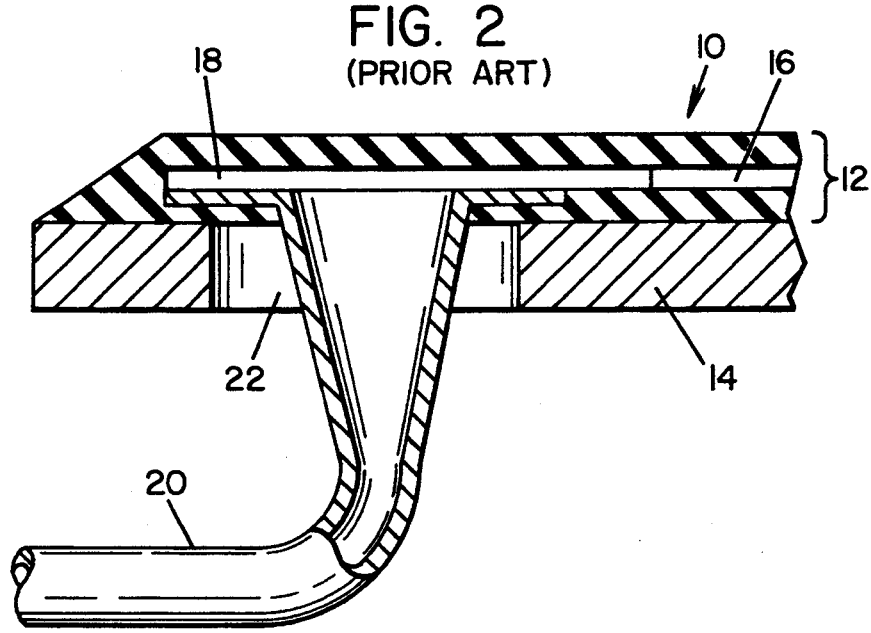
FIG. 2 is an enlarged fragmentary cross-sectional view taken along line 2—2 of FIG. 1.

Referring now to FIG. 3, a first embodiment of a pneumatic deicing system 110 includes a pneumatic deicing assembly 112, comprised substantially of a flexible elastomeric or composite material having inflatable tube-like members which are inflated by a pressurized fluid source (not shown). Deicing system 110 is illustrated in FIG. 3 in a noninflated state. Flexible elastomeric pneumatic deicing assemblies are well known in the art, examples of which are disclosed in commonly owned U.S. Pat. Nos. 4,779,823, 4,561,613, 5,112,011 and 4,687,159, all of which are hereby incorporated by reference herein. The deicer assembly 112 is bonded to a shell 114, which is attached to the airfoil (not shown) to be deiced. Shell 114 must be a resilient yet flexible material, such as a composite, and preferably a plastic composite. Composites, and plastic composites are well known in the art. A suitable composite material for shell is fiberglass. Under these conditions, a cement, such as an epoxy cement may be used to bond the deicer assembly 112 to the shell 114. A connector 116 is disposed within a hole 118 in the shell 114 for placing the deicer assembly 112 in fluid communication with a fluid source (not shown). Connector 116 has an output flange 120 which is bonded to the shell 114 utilizing a cement, such as an epoxy cement. Connector 116 also has an input flange or barb 122 which is utilized to provide a snap type connection which will be described in greater detail hereinafter. Connector 116 represents the male part of a snap type connection means. An O-ring 124 is disposed within an annular groove 126 for providing a sealing means when connector 116 is mated with its female counterpart.

It is evident from FIG. 3 that the airfoil to be deiced must have a receptacle for receiving connector 116 and also a pathway or passage for putting the deicer assembly 112 in fluid communication with a fluid source (not shown). For communicating fluid, connector 116 has a cylindrical input orifice 128 which merges into a frustoconical opening 130 which merges into a cylindrical passageway 132. A plurality of slots 129 extending axially through connector 116 to orifice 128 and frustoconical opening 130 allows the shell to flex inward when the connector 116 is being mated with its connective counterpart, not shown in FIG. 3 but described in greater detail hereinafter.

Referring now to FIG. 4, a second embodiment of a deicing system 140 in accordance with the present invention includes a deicer assembly 142 and a shell 144 similar to deicer assembly 112 and shell 114 illustrated in FIG. 3. A jacket 146 of radar absorptive material, such as carbonyl iron, is provided over the leading edge 148 of the shell 144 between the shell 144 and the deicer assembly 142. Jacket 146 is preferably bonded to the shell 144 utilizing a cement, such as an epoxy cement and is bonded to deicer assembly 142 utilizing a cement, such as an epoxy cement. Jacket 146 of radar absorptive material reduces the radar signature of the airfoil to be deiced.

Referring now to FIG. 5, a receptacle 150 or female connector for mating with male connector 116 includes a cylindrical opening 152 for receiving the connector 116. Cylindrical opening 152 merges into a frustoconical seat face 154 for engaging with frustoconical surface 123 of male connector 116. Frustoconical seat face 154 merges into cylindrical aperture 156 which merges into a duct 158. Connector 116 is preferably made of a formed, resilient nonmetal such as hardened rubber. The female connector 150 is preferably made of a suitable composite, such as fiberglass. O-ring 124 seals the connector 116 in the receptacle 150 and thereby prevents blow- by of fluid.

Referring now to FIG. 6, a third embodiment of a deicing system 170 includes a deicing assembly 172, similar to deicing assembly .112 described and illustrated herein before in FIG. 3 which is formed or bonded to a shell 174, which is similar to shell 114 described herein before in FIG. 3. The ends of shell 174 opposite the leading edge end are configured in a manner so as to have a snap together function. In this manner one side of shell 174 has a connection means 176 in the form of a nipple shaped protrusion while the other side of shell 174 is configured to have a corresponding connection means 178 in the form of female receptacle to receive the nipple 176. Deicing system 170 may therefore be held in place on the airfoil structure by positioning the assembly around the airfoil structure and then "snapping" it together. This function makes both installation and removal of the deicing system easy, and allows use of deicing systems in hard to get places not previously deicable. Of course, the connection means of the present invention may have other configurations than that specifically shown, the important point being that the shell of the present invention is adapted to have an attachment scheme such that the shell positively engages with, or snaps onto the airfoil to be deiced.

Alternatively, deicing system 170 may be constructed with a male connection means 176, such as a nipple shaped protrusion which is mated with a female connector portion provided in the airfoil. In this attachment scheme, deicing system 170 doesn't necessarily fully enclose the airfoil, yet it has the similar advantage of being adapted to be snapped into place.

Referring now to FIG. 7, wherein connector 116 is illustrated as having four slots 129 provided therein to facilitate flexing of the nipple shaped connector 116 inward when it is inserted into the female connector 150. Of course other slot quantities and configurations may be utilized to accomplish the same objective.

It is also to be understood that if the deicing system of the present invention is configured such that it doesn't fully enclose the airfoil, the fluid connector, such as connector 116 illustrated and described hereinbefore, may also be utilized to perform the attachment function in addition to the fluid connection function. That is, the fluid connector would perform two distinct functions, attachment and fluid connection.

Referring now to FIG. 8, wherein a pneumatic deicing system in accordance with a fourth embodiment of the present invention is generally similar to the pneumatic deicing assemblies illustrated hereinbefore in the previous figures and is thus indicated by references numerals corresponding to those discussed above, except that a 200 "prefix" is utilized. A pneumatic deicing system 210 thus includes a pneumatic deicing assembly 212, comprised substantially of a flexible elastomeric or composite material having inflatable tube-like members which are inflated by a pressurized fluid source (not shown). Deicing system 210 is illustrated in FIG. 8 in a noninflated state. A connector 216 is attached or bonded to the deicer assembly 212 in fluid communication with a fluid source (not shown). Connector 216 has an output flange 220 which is bonded to the deicer assembly 212 utilizing a cement, such as an epoxy cement. Connector 216 also has an input flange or barb 222 which is utilized to provide a snap type connection as described hereinbefore. Connector 216 represents the male part of a snap type connection means. An O-ring 224 is disposed within an annular groove 226 for providing a sealing means when connector 216 is mated with its female counterpart. Deicer system 210 does not include a shell as previously discussed. The principal method of attaching the assembly 212 to the airfoil is by bonding the two together utilizing an appropriate cement. Connector 216 provides a convenient connection means for connecting fluid to the deicer assembly 212.

Figure 9:
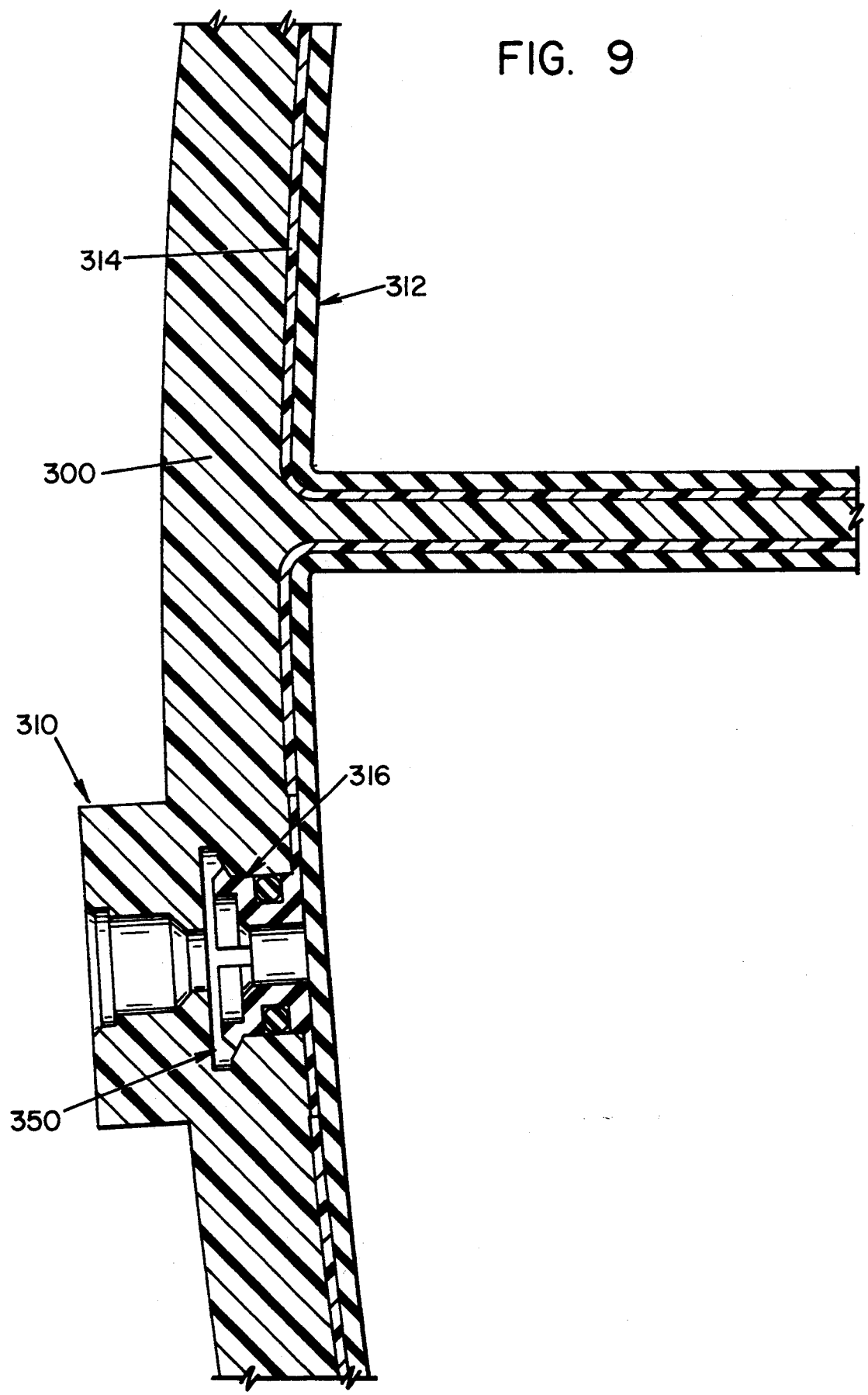
FIG. 9 is a cross-sectional view of a pneumatic deicing system in accordance with a fifth embodiment of the present invention.

Referring now to FIG. 9, wherein a pneumatic deicing system in accordance with a fifth embodiment of the present invention is generally similar to the pneumatic deicing assemblies illustrated hereinbefore in the previous figures and is thus indicated by references numerals corresponding to those discussed above, except that a 300 "prefix" is utilized. A pneumatic deicing system 310 thus includes a pneumatic deicing assembly 312, comprised substantially of a flexible elastomeric or composite material having inflatable tube-like members which are inflated by a pressurized fluid source (not shown). Deicing system 310 is illustrated in FIG. 9 in a noninflated state. The deicer assembly 312 is bonded to a shell 314, which is attached to the airfoil 300 to be deiced. A connector 316 is integrated into shell 314 for placing the deicer assembly 312 in fluid communication with a fluid source (not shown). Connector 316 represents the male part of a snap type connection means. A receptacle 350 or female connector for mating with male connector 316 is provided in the airfoil 300. It can be seen that deicer assembly 312 has a "T" shape and does not encompass the entire airfoil to be deiced, but can still be snapped into place for easy installation and removal.

A deicing assembly having the features illustrated in FIGS. 3–9 provides an assembly which allows fluid to be routed through a very thin airfoil, thereby eliminating the need for external fluid lines. In addition, the present invention provides deicing for tightly fitted airfoils, such as those found on turbine engine inlets.

Although the invention has been shown and described with exemplary embodiments thereof, it should be understood by those skilled in the art that the foregoing and various changes, omissions and additions may be made therein and thereto without departing from the spirit and scope of the invention.

We claim:

1. A pneumatic deicing system utilizing pressurized fluid from a fluid source and adapted for overlying an airfoil substructure, the de-icer having an outer surface that meets and breaks an impinging airstream when overlying the substructure comprising:
   a composite shell for disposal over the substructure, said shell having snap type airfoil connection means for connectively attaching said shell to the airfoil in a snap type manner;
   a flexible deicing member having an inflatable portion provided therein, a top side and a bottom side attached to said shell; and,
   fluid connection means for placing said deicing member in fluid communication with the fluid source.

2. A pneumatic deicing system in accordance with claim 1, further comprising an intermediate layer of radar absorptive material disposed between at least part of said shell and said deicing member.

3. A pneumatic deicing system in accordance with claim 1, wherein said airfoil connection means is comprised of at least one male connector means and wherein the airfoil includes at least one female connector means for receiving and engaging with said male connector means.

4. A pneumatic deicing system in accordance with claim 3, wherein said male connector means is nipple shaped.

5. A pneumatic deicing system in accordance with claim 1, wherein said fluid connection means and said airfoil connection means are an integral assembly.

6. A pneumatic deicing system in accordance with claim 1, wherein said fluid connection means is comprised of a generally cylindrical protrusion having an annular groove disposed therein for receiving an O-ring and a substantially frustoconically shaped barb formed on the end for disposal within a female shaped connector adapted for receiving and engaging with said fluid connection means.

7. A pneumatic deicing system in accordance with claim 1, wherein said shell is comprised of a plastic composite.

8. A pneumatic deicing system in accordance with claim 1, wherein said shell is comprised of fiberglass.

9. A pneumatic deicing system in accordance with claim 1, wherein said deicer assembly is comprised of an elastomer.

10. A pneumatic deicing system in accordance with claim 2, wherein said radar absorbent material is carbonyl iron.

11. A pneumatic deicing system in accordance with claim 1, wherein said shell surrounds the airfoil to be deiced and wherein said airfoil connection means is comprised of at least one male connector means on said shell and a corresponding female connector means for receiving and engaging with each one of said at least one male connector means, said connector means being located such that said deicing system is held, onto the airfoil by engaging said male connector means with said female connector means.

12. A pneumatic deicing system in accordance with claim 11, wherein said male connector means is nipple shaped.

13. A method of deicing an airfoil comprising the steps of:
   providing a pneumatic deicing system in accordance with claim 1;
   attaching said pneumatic deicing system to the airfoil by engaging said airfoil connection means; and,
   inflating said pneumatic deicing system with pressurized fluid.

14. A method of deicing an airfoil in accordance with claim 13, wherein said airfoil connection means is comprised of at least one male connector means and wherein the airfoil includes at least one female connector means for receiving and engaging with said male connector means.

15. A method of deicing an airfoil in accordance with claim 14, wherein said male connector means is nipple shaped.

16. A method of deicing an airfoil in accordance with claim 13, wherein said fluid connection means and said airfoil connection means are an integral assembly.

17. A method of deicing an airfoil in accordance with claim 13, wherein said fluid connection means is comprised of a generally cylindrical protrusion having an annular groove disposed therein for receiving an O-ring and a substantially frustoconically shaped barb formed on the end for disposal within a female shaped connector adapted for receiving and engaging with said fluid connection means.

18. A method of deicing an airfoil in accordance with claim 13, wherein said shell is comprised of a plastic composite.

19. A method of deicing an airfoil in accordance with claim 13, wherein said shell is comprised of fiberglass.

20. A method of deicing an airfoil in accordance with claim 13, wherein said deicer assembly is comprised of an elastomer.

21. A method of deicing an airfoil in accordance with claim 13, wherein said shell surrounds the airfoil to be deiced and wherein said airfoil connection means is comprised of at least one male connector means on said shell and a corresponding female connector means for receiving and engaging with each one of said at least one male connector means, said connector means being located such that said deicing system is held onto the airfoil by engaging said male connector means with said female connector means.

22. A method of deicing an airfoil in accordance with claim 21, wherein said male connector means is nipple shaped.

23. A pneumatic deicing system utilizing pressurized fluid from a fluid source and adapted for overlying an airfoil substructure, the de-icer having an outer surface that meets and breaks an impinging airstream when overlying the substructure comprising:
- a flexible deicing member having an inflatable portion provided therein, and a plurality of first connection means;
- a plurality of second connection means provided integrally with the airfoil for connectively engaging with said airfoil connection means for attaching said flexible deicing member to the airfoil; and,
- at least one fluid connection means for placing said deicing member in fluid communication with the fluid source,
- wherein said deicer assembly surrounds the airfoil to be deiced and wherein said airfoil connection means is comprised of at least one male connector means on said deicer assembly and a corresponding female connector means for receiving and engaging with each one of said at least one male connector means, said connector means being located such that said deicing system is held onto the airfoil by engaging said male connector means with said female connector means.

24. A pneumatic deicing system utilizing pressurized fluid from a fluid source and adapted for overlying an airfoil substructure, the de-icer having an outer surface that meets and breaks an impinging airstream when overlying the substructure comprising:
- a rigid shell having snap type airfoil connection means;
- a flexible deicing member having an inflatable portion provided therein, a top side and a bottom side attached to said shell; and,
- shell connection means provided integrally with the airfoil for connectively engaging with said airfoil connection means for attaching said shell to the airfoil in a snap type manner.

25. A pneumatic deicing system for attachment to an airfoil utilizing pressurized fluid from a fluid source comprising:
- a rigid shell having airfoil connection means;
- a flexible deicing member having an inflatable portion provided therein, a top side and a bottom side attached to said shell; and,
- shell connection means provided integrally with the airfoil for connectively engaging with said airfoil connection means for attaching said shell to the airfoil,
- wherein said airfoil and shell connection means also provide an integral fluid connection assembly for transfer of fluid to the deicer.

26. A pneumatic deicing system utilizing pressurized fluid from a fluid source and adapted for overlying an airfoil substructure, the de-icer having an outer surface that meets and breaks an impinging airstream when overlying the substructure comprising:
- a rigid shell having snap type connection means for connectively attaching said shell to the substructure in a snap type manner; and,
- a flexible deicing member having an inflatable portion provided therein, a top side and a bottom side attached to said shell,
- wherein said shell surrounds the airfoil to be deiced and wherein said airfoil connection means is comprised of male and female portions, said connector means being located such that said deicing system is held onto the airfoil by engaging said male and female portions.

27. A pneumatic deicing system utilizing pressurized fluid from a fluid source and adapted for overlying an airfoil substructure, the de-icer having an outer surface that meets and breaks an impinging airstream when overlying the substructure comprising:
- a flexible deicing member having an inflatable portion provided therein, and rigid snap type connection means for connectively attaching said shell to the substructure in a snap type manner,
- wherein said flexible deicing member surrounds the airfoil and wherein said connection means is comprised of male and female portions, said connector means being located such that said deicing system is held onto the airfoil by engaging said male and female portions.

* * * * *